United States Patent [19]

Lee et al.

[11] E Patent Number: Re. 33,749

[45] Reissued Date of Patent: Nov. 19, 1991

[54] STORAGE STABLE HEAT CURABLE ORGANOSILOXANE COMPOSITIONS CONTAINING MICROENCAPSULATED PLATINUM-CONTAINING CATALYSTS

[75] Inventors: Chi-Long Lee, Midland; Donnie R. Juen, Sanford; John C. Saam; Robin L. Willis, Jr., both of Midland, all of Mich.

[73] Assignee: Dow Corning Corporation, Midland, Mich.

[21] Appl. No.: 573,501

[22] Filed: Aug. 24, 1990

Related U.S. Patent Documents

Reissue of:

[64] Patent No.: 4,766,176
Issued: Aug. 23, 1988
Appl. No.: 75,177
Filed: Jul. 20, 1987

[51] Int. Cl.[5] ..... C08F 8/00

[52] U.S. Cl. ..... 525/100; 528/15; 528/31; 528/32; 525/104; 525/105; 525/478

[58] Field of Search ..... 525/100, 104, 105, 478; 528/15, 31, 32

[56] References Cited

U.S. PATENT DOCUMENTS

| | | | |
|---|---|---|---|
| 3,284,406 | 11/1966 | Nelson | 260/46.5 |
| 3,419,593 | 12/1968 | Willing | 260/448.2 |
| 3,523,906 | 8/1970 | Geva | 264/4.6 |
| 3,859,228 | 1/1975 | Morishita et al. | 252/316 |
| 3,886,084 | 5/1975 | Vassilliades | 252/316 |
| 4,181,639 | 1/1980 | Bayer | 524/517 |
| 4,293,677 | 10/1981 | Imai | 528/15 |
| 4,402,856 | 9/1983 | Schnoering | 428/402.22 |
| 4,411,933 | 10/1983 | Samejima | 427/213.3 |
| 4,461,854 | 7/1984 | Smith | 524/268 |
| 4,462,982 | 7/1984 | Samejima et al. | 424/35 |
| 4,481,341 | 11/1984 | Schlak | 525/478 |
| 4,495,227 | 1/1985 | Tanaka | 521/112 |
| 4,528,354 | 7/1985 | McDougal | 528/33 |
| 4,542,042 | 9/1985 | Samejima et al. | 427/213.36 |
| 4,604,444 | 8/1986 | Donnadieu et al. | 528/34 |

*Primary Examiner*—Melvyn I. Marquis
*Attorney, Agent, or Firm*—Robert Spector

[57] ABSTRACT

Storage stable, one part organosiloxane compositions that cure upon heating by a platinum-catalyzed hydrosilation reaction comprise, in addition to the organosiloxane reactants, a platinum-containing hydrosilation catalyst that is microencapsulated within one or two layers of thermoplastic organic polymers. The microcapsules are formed using known techniques.

16 Claims, No Drawings

STORAGE STABLE HEAT CURABLE ORGANOSILOXANE COMPOSITIONS CONTAINING MICROENCAPSULATED PLATINUM-CONTAINING CATALYSTS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to organosiloxane compositions that cure by means of a platinum-catalyzed hydrosilation reaction. More particularly, this invention relates to one-part organosiloxane compositions of this type that exhibit long term storage stability under ambient conditions yet cure rapidly at temperatures of about 70° C. and above.

2. Description of the Prior Art

One of the most useful classes of polyorganosiloxane compositions cure by a platinum catalyzed hydrosilation reaction. The advantages of these compositions relative to moisture curable polyorganosiloxane compositions is their rapid curing rate, particularly at temperatures above about 70° C. and their ability to cure in thick sections. Compositions that cure by a hydrosilation reaction typically contain a polydiorganosiloxane with at least two ethylenically unsaturated hydrocarbon radicals per molecule, an organohydrogensiloxane containing at least two silicon bonded hydrogen atoms per molecule in an amount sufficient to achieve curing of the composition and a platinum-containing catalyst in an amount sufficient to promote curing of the composition. Fillers and other additives may be present for the purpose of modifying physical and/or chemical properties of the composition either prior to or following curing.

Because the aforementioned platinum catalyzed organosiloxane compositions begin to cure even at ambient temperature once the reactants are combined, the platinum catalyst and the organohydrogensiloxane reactant usually are packaged in separate containers and are not combined until it is desired to cure the composition. Even if the composition contains one or more of the known platinum catalyst inhibitors it cannot be stored in a single container for more than a few hours.

One of the alternatives proposed in the prior art to supplying platinum-catalyzed curable organosiloxane compositions as two-package materials is to isolate either the catalyst or the organohydrogensiloxane within a matrix of a material that is solid under the conditions encountered during storage of the curable composition, and which allows the entrapped reactant or catalyst to escape and mix with the other ingredients when it is desired to cure the composition.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid material, such as a silicone resin, at a concentration of from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70° C. and 250° C. The alleged advantage of the compositions disclosed by Schlak et al. is that the catalyst remains isolated from the other ingredients of the curable composition until the composition is heated sufficiently to melt the material in which the catalyst is dispersed. Because the organosilicon compounds present in the composition will not cure in the absence of the catalyst, the composition can allegedly be stored for long periods of time without undergoing curing or even an increase in viscosity.

A disadvantage of the curable organosiloxane compositions described by Schlak et al. is the presence of an incompatible resin in the curable composition. The maximum platinum content disclosed for the catalyst/resin mixture is 5 percent by weight, and is 0.1 percent in the single exemplified composition. The catalyst mixture is prepared by combining 100 parts by weight of a solubilized silicone resin with 10 parts by weight of a solution of the platinum catalyst in isopropanol. The solution contains 1 percent by weight of the catalyst, based on the platinum metal content. This requires a relatively large amount of resinous carrier material in addition to the catalyst. By definition the carrier is insoluble in the other organosilicon compounds present in the composition. The carrier may therefore detract from the appearance and/or properties of the cured material.

A second potential disadvantage of Schlak et al. catalyst resides in the method used to prepare the catalyst composition. A solid block or sheet of resin with the platinum-containing material dispersed throughout is ground to a fine powder. The random nature of the grinding operation makes it possible that some of the particles will contain platinum catalyst on their surface. Even trace amounts of platinum have been shown to cause premature curing of the type of organosiloxane composition exemplified in this patent.

One way to avoid the inherent disadvantages of the catalyst compositions described in the Schlak et al. patent, is to completely microencapsulate finely divided particles or droplets of a catalyst composition within a material that is impermeable to the catalyst and effectively isolates it from the reactive ingredients of a curable organosiloxane composition. The encapsulant melts or softens at the desired curing temperature of the composition. A variety of methods for microencapsulating materials are known in the art.

The prior art discloses one-part curable organosiloxane compositions containing microencapsulated reactants or catalysts. One example of this type of art is U.S. Pat. No. 4,528,354. which issued to McDougal and Dougherty on July 9, 1985. This patent teaches a method for curing one-part peroxide curable silicone rubber compositions. A liquid phase containing an organic peroxide is encapsulated within a shell of a resinous thermosetting material that is impervious to the peroxide. The capsules are designed to rupture under a given internal vapor pressure that is generated by the encapsulated liquid when a curable composition containing the microcapsules is heated.

Because release of the peroxide is dependent upon rupturing rather than melting of the shell separating the peroxide from the other ingredients of the organosiloxane composition, the composition and thickness of the shell must be carefully controlled to ensure that rupture of the capsules will occur reproducibly within the temperature range used to cure the organosiloxane composition.

European Published Patent Application No. 140,770 which issued on May 8, 1985 describes storage stable polyorganosiloxane compositions comprising a polyhydroxylated polyorganosiloxane, a polyacyloxysilane and a microencapsulated accelerator. The coating material of the microcapsules can be penetrated using heat and/or irradiation. Suitable encapsulting materials including polystyrene, acrylonitrile-styrene copolymers, and polymethyl methacrylate. This publication does not suggest using microencapsulated materials in organosiloxane compositions curable by means other than the reaction of polyhydroxylated polyorganosiloxanes with acyloxysilanes.

U.S. Pat. No. 4,293,677, which issued to Imai on Oct. 6, 1981 describes encapsulating organohydrogensiloxanes using complex coacervation and in-situ polymerization, two of the most common microencapsulation techniques. In accordance with Example 1 of this patent, an aqueous gelatin solution adjusted to a pH of 9.5 was added to a solution of a trimethylsiloxy terminated polymethylhydrogensiloxane in molten paraffin wax. A 10 percent by weight solution of gum arabic is then added and the pH of the resultant emulsion is adjusted to 4 over a period of two hours to precipitate a mixture of the two polyelectrolytes that forms the encapsulant. The encapsulant is cured by gradually heating the dispersion of coated particles to a temperature of 50° C.

The in-situ polymerization process exemplified in Example 2 of the Imai patent involves the polymerization of styrene in the presence of a dimethylsiloxane/-methylhydrogensiloxane copolymer as the dispersed phase of an emulsion wherein the aqueous phase contains a solubilized polyvinyl alcohol and potassium persulfate.

A disadvantage of encapsulating the organohydrogensiloxane reactant as taught by Imai et al. is the relatively large amount of encapsulating polymer that is introduced into the composition. Many of the thermoplastic organic polymers suitable for use as encapsulants are incompatible with the reactants present in the curable composition. As mentioned hereinbefore in connection with the Schlack patent, the presence of relatively large amounts of an incompatible polymer may detract from the appearance, physical properties and optical properties of the cured material.

The amount of incompatible encapsulating polymer introduced into a curable composition can be reduced by encapsulating the platinum-containing catalyst rather than the organohydrogensiloxane reactant as taught by Imai et al. One of the most effective classes of platinum-containing catalysts for curing organosiloxane compositions of the type described in the Imai et al. patent are reaction products of an inorganic platinum compound such as hexachloroplatinic acid with liquid vinyl-containing organosilicon compounds such as symtetramethyl-divinyldisiloxane. The resultant product can be used as such or diluted to a lower platinum content, by addition of a liquid dimethylvinylsiloxy terminated polydimethylsiloxane.

The present inventors undertook an investigation with the objective of preparing one-part organosiloxane compositions that could be stored up to one year or longer under ambient conditions. yet cured rapidly at temperatures above 100° C. by a platinum-catalyzed hydrosilation reaction and contained unusual amounts of incompatible polymers. This objective was achieved by isolating the platinum catalyst from the other ingredients of the composition by microencapsulating it within at least one layer of a thermoplastic organic polymer. Depending upon the manner in which the microcapsules were prepared, in some instances it was necessary to wash the microencapsulated catalyst in a solvent for the catalyst prior to blending it with the other ingredients of the polyorganosiloxane composition.

SUMMARY OF THE INVENTION

One part, storage stable organosiloxane compositions that cure at temperatures of at least 70° C. by means of a platinum-catalyzed hydrosilation reaction contain the catalyst in the form of microcapsules wherein the catalyst is enveloped within at least one thermoplastic organic polymer. The catalysts are prepared using known microencapsulation techniques.

DETAILED DESCRIPTION OF THE INVENTION

This invention provides an improved one-part, storage stable, heat curable organosiloxane composition comprising (A) a curable polyorganosiloxane containing at least two ethylenically unsaturated hydrocarbon radicals per molecule:

(B) an organohydrogensiloxane containing at least two silicon bonded hydrogen atoms per molecule in an amount sufficient to achieve curing of said polyorganosiloxane (A), where the sum of the average number of ethylenically unsaturated hydrocarbon radicals per molecule of (A) and the average number of silicon bonded hydrogen atoms per molecule of said organohydrogensiloxane (B) is greater than 4, and (C) an amount of a platinum-containing hydrosilation catalyst sufficient to promote curing of said composition at temperature of at least 70° C. and above.

The improvement comprises the presence of the platinum-containing catalyst in the form of microcapsules that, in turn, comprise said catalyst as finely divided particles or droplets that are completely enveloped within one or two layers of a thermoplastic organic polymer. The average diameter of said microcapsules is less than 500 microns, and said thermoplastic organic polymer constitutes at least 50 percent of the weight of said microcapsules.

The characterizing feature of the present compositions is the presence of a microencapsulated platinum-containing catalyst. Because the catalyst is effectively isolated from the other ingredients of the composition until the composition is heated to the melting or softening point of the thermoplastic polymer(s) surrounding the catalyst, the compositions are stable for extended periods of time, typically several months or longer, under ambient conditions, yet cure relatively rapidly at temperatures above the melting or softening point of the thermoplastic polymer(s).

As used herein the term "platinum-containing hydrosilation catalyst" includes metals in the platinum group of the periodic table and compounds of these metals that are capable of catalyzing a hydrosilation reaction. This reaction occurs between a silicon bonded hydrogen atom and an ethylenically unsaturated hydrocarbon radical such as vinyl.

In accordance with the present invention, any of the known platinum-containing hydrosilation catalysts described in the prior art can be microencapsulated and incorporated into organosiloxane compositions curable by a hydrosilation reaction. Suitable catalysts include finely divided platinum or other platinum group metal deposited on carbon black and many compounds of platinum group metals. Reaction products and complexes of inorganic compounds of platinum, particularly halogen compounds, with organosilicon compounds are preferred because of their compatibility with the reactants in the curable organosiloxane compositions of this invention.

The encapsulated platinum-containing catalyst can be a liquid or solid at ambient temperature. Solid catalysts can be encapsulated in this form or dissolved in a solvent that will not dissolve the encapsulating polymer(s). To increase the density of the microcapsule the catalyst composition can be prepared by treating a finely divided solid such as silica or quartz with one of the aforementioned platinum-containing hydrosilation catalysts in liquid or solubilized form.

The particles or droplets of platinum-containing catalyst composition are completely enveloped within at least one thermoplastic organic polymer. The catalyst composition can be distributed throughout the volume of the microcapsule or can be concentrated in one or more "core" areas.

The thermoplastic organic polymers used to encapsulate the catalyst are insoluble in and impervious to the catalyst. In addition, the polymers are insoluble in the curable organosiloxane compositions of this invention. If the organic polymer surrounding the catalyst is, in turn, encapsulated within a shell formed from a second organic polymer, the polymers are preferably different, and each must meet all of these requirements.

Polymers useful as encapsulants for the platinum catalysts include but are not limited to addition type polymers such as polyethylene, polystyrene, polyvinyl chloride, polyvinylidene chloride, copolymers of vinyl chloride and vinylidene chloride, polyacrylates such as polymethyl methacrylate, polyacrylonitrile and copolymers of acrylonitrile with butadiene and/or styrene. Suitable condensation type polymers include but are not limited to polyamides and polyesters. Cellulose esters such as cellulose acetate and mixed esters such as cellulose acetate butyrate can also be used.

It will be understood that "insolubility" and "impermeability" are relative terms. Many solids will dissolve to a very limited extent in liquids in which they are considered insoluble, just as a limited degree of diffusion of a material through an "impermeable" layer will occur, given sufficient time. As used herein the terms "insoluble" and "impermeable" imply that the amount of encapsulant that dissolves in the catalyst and/or the curable composition and the amount of catalyst that diffuses through the walls of the microcapsules during storage of the curable organosiloxane composition are insufficient to cause curing of the composition. In some instances a slight increase in viscosity during storage will be observed.

In order for the present microencapsulated catalysts to function effectively in organosiloxane compositions that cure by a platinum catalyzed hydrosilation reaction the catalyst must be able to penetrate the encapsulating polymer at the desired curing temperature of the organosiloxane composition.

The present microcapsules are essentially spherical in contour with diameters of up to 500 microns. Diameters of less than 50 microns are preferred because they are more readily incorporated into curable organosiloxane compositions. Depending upon the method used to prepare the microcapsules, they can deviate from this contour at one or more locations around their perimeter, particularly if the encapsulated material is a solid particle such as quartz that was treated with a liquid or solubilized catalyst composition prior to being encapsulated.

The thermoplastic organic polymer(s) constitutes at least 50 percent by weight of the microcapsules. The microcapsules, in turn, include the encapsulating polymer (or polymers in the case of the two-layer capsules described hereinafter and in a copending patent application filed concurrently with this application) and the catalyst together with any liquids used to dissolve and/or dilute the catalyst and/or any solid carriers for the catalyst. Preferably the weight of the thermoplastic polymers constitutes at least 70 percent by weight of the microcapsule.

The present inventors found that it is not feasible to encapsulate all of the catalyst and any associatied liquid materials using conventional microencapsulation methods when the encapsulating polymers constitute less than 50 percent by weight of the microcapsules. The excess catalyst typically collects on the surface of the capsules, and often results in premature curing of organosiloxane compositions containing these encapsulated catalysts. Even if the excess catalyst is removed by washing with a suitable solvent for the catalyst, the shell of the microcapsule may not be of sufficient thickness to prevent diffusion of catalyst from the interior to the surface of the microcapsule.

The thermoplastic organic polymer(s) that encapsulate the platinum-containing catalyst can be deposited using any of the chemical, physico-chemical or physical methods described in the aforementioned prior art and summarized hereinafter.

Chemical methods for microencapsulation are described in U.S. Pat. No. 3,859,228, which issued to Morishita et al. on Jan. 7, 1975; U.S. Pat. No. 4,462,982, which issued to Samejima et al. on July 31, 1984; British Patent No. 1,354,694, which issued on May 30, 1974; U.S. Pat. No. 4,411,933, which issued to Samejima et al. on Oct. 25, 1983; U.S. Pat. No. 4,402,856, which issued to Schnoering et al. on Sept. 6, 1983; U.S. Pat. No. 4,542,042, which issued to Samejima et al. on Sept. 17, 1985; U.S. Pat. No. 3,886,084, which issued to Vassiliades on May 27, 1975; and U.S. Pat. No. 4,181,639, which issued on Jan. 1, 1980.

U.S. Pat. No. 3,523,906, which issued to Alois and Nicholas on Aug. 11, 1970, describes a microencapsulation method using a preformed polymer as the encapsulant. The solubilized encapsulant is emulsified in an aqueous medium containing a hydrophilic colloid. The encapsulant can be a vinyl polymer or copolymer, a polycarbonate, polyester, polysulfonate, polyurethane, polyamide, chlorinated natural rubber or a cellulose derivative that is soluble in a water immiscible solvent and forms a dry, solid, water insoluble film in the solvent-free state.

U.S. Pat. No. 4,389,330, which issued to Tice and Lewis on June 21, 1983 discloses a microencapsulation process whereby an active agent is dissolved or dispersed in a solvent and the encapsulating material is dissolved in the same solvent. The solvent containing the active agent and encapsulant is then dispersed in a continuous phase processing medium and a portion of the solvent is evaporated to precipitate the encapsulant around the active ingredient in the form of microcapsules suspended in the aforementioned continuous phase. The novel feature of this method resides in extracting the remainder of the solvent at this stage, i.e. after the microcapsules have been formed and remain suspended in the continuous phase.

Microencapsulated materials can also be formed by mechanical means that typically set the solid particles to be encapsulated in motion by centrifugal force or air currents in a fluidized bed reactor. The particles are directed through a film or spray of molten or solubilized encapsulant.

One of the physico-chemical methods for preparing microcapsules is coacervation, which is typically a three step process. In the first step a liquid vehicle forms the continuous phase, and at least one polyelectrolyte in liquified form together with the material to be encapsulated forms the dispersed phase. The liquid vehicle initially contains the solubilized encapsulant that is subsequently phased out of solution as a liquid coacervate to form a three-phase system. In a simple coacervation process the encapsulant is a single polyelectrolyte such as gelatin. Complex coacervation involves using two polyelectrolytes of opposite charge, such as gelatin and gum arabic, that are concurrently phased out of solution.

The phasing out of a simple coacervate can be accomplished in a number of ways, including changing the temperature of the system, or by addition of a salt or a nonsolvent for the encapsulant. In a complex coacervation process the encapsulant can be precipitated by changing the pH of the composition.

The second step of a coacervation process involves deposition of the encapsulant phase around droplets or solid particles of the material to be encapsulated. For this to occur, there must be a driving force for adsorption of the encapsulant at the surface of the material to be encapsulated.

During the third step of the process the encapsulant is solidified. The mean for accomplishing this can be a continuation of the one used to bring about separation of the encapsulant during the second step of the process, or the encapsulant can be solidified by chemical means, including cross linking, chelation or grafting. The resultant particles of encapsulated material can be isolated by conventional filtration and drying techniques. The size of the particles and the thickness of the coating is a function of several variables, including the relative concentrations of encapsulant and substrate and the rate of stirring during the coacervation process.

One of the chemical methods for preparing a microencapsulated material involves an in-situ polymerization of at least one monomer on the surface of a finely divided catalyst in the form of solid particles or droplets. The monomer can be an ethylenically unsaturated organic monomer such as ethylene, styrene, vinyl chloride, vinylidene chloride, or an ester of acrylic or methacrylic acid such as methyl methacrylate. Mixtures containing two or more of these ethylenically unsaturated monomers can be used, depending upon the physical and chemical properties desired for the encapsulant. Preferred monomer mixtures include mixtures of styrene and acrylonitrile, and mixtures of vinylidene chloride with other ethylenically unsaturated monomers.

Alternatively, the polymerization reaction used to prepare the encapsulating polymer can involve a condensation reaction between two or more monomers or a single cyclic monomer such as a lactone or lactam. An example of such a condensation polymerization is the interfacial reaction between sebacoyl chloride and hexamethylene diamine to form a polyamide.

At least one of the condensable monomers together with the particles or droplets to be encapsulated are emulsified in an aqueous medium, which may also contain a catalyst for the polymerization. Depending upon the type of monomer(s) selected, formation of the encapsulating polymer is effected by heating, exposure to ultraviolet or other type of radiation, or allowing the reactants of a condensation polymerization to contact one another in the presence of an appropriate catalyst.

One of the preferred methods for encapsulating the platinum-containing catalyst is a physico-chemical one whereby a solubilized encapsulating polymer is precipitated from an emulsion that also contains the catalyst composition as part of the dispersed phase. During the first step of this method the catalyst in finely divided form is dispersed in a solution of the encapsulant polymer. Preferred polymers are those formed from the monomers discussed hereinabove in connection with the in-situ polymerization method for forming microcapsules.

The catalyst can be a solid or liquid. Liquid catalysts can optionally be adsorbed or absorbed on the surface of a solid particle such as silica.

The solvent for the encapsulating polymer must be immiscible with the continuous phase of the emulsion, which can be water, an organic liquid or a liquid polyorganosiloxane. In addition the boiling point of either the encapsulant solvent alone or an azeotropic mixture of this solvent and the continuous phase of the emulsion must be below the melting point of the encapsulating polymer.

The dispersion of catalyst composition in the solubilized encapsulating polymer is then emulsified in the continuous phase and the encapsulant solvent is removed by evaporation. Depending upon the boiling point of the solvent, evaporation can be achieved at ambient temperature by stirring the emulsion while passing an inert gas such as nitrogen through the reactor. Removal of higher boiling solvents such as toluene may require heating the emulsion under ambient or reduced pressure. The process conditions during evaporation of the encapsulant solvent are such that the encapsulant precipitates as a film around each of the suspended particles.

The method for microencapsulating a platinumcontaining catalyst composition with a preformed, solubilized thermoplastic polymer typically comprises the following series of steps:

A. emulsifying or dispersing in the continuous phase liquid (1) a finely divided form of the catalyst composition as particles or droplets and 2) a solution of the encapsulant in a liquid that is immiscible with the continuous phase, the weight of encapsulant being at least equal to the weight of catalyst composition, B. evaporating an amount of encapsulant solvent sufficient to precipitate the encapsulant as a coating around substantially all the particles or droplets of catalyst composition, and C. solidifying and recovering the resultant microcapsules.

To ensure the substantial absence of platinum catalyst on the outer surface of microcapsules prepared using any of the aforementioned methods, the microcapsule are preferably washed with a solvent for the catalyst that will not dissolve the encapsulating polymer(s). It has been found that even trace amounts of the catalyst on the surface of the microcapsule can result in premature curing of the present compositions.

If the catalyst is one of the preferred reaction products of hexachloroplatinic acid with an ethylenically unsaturated liquid organosilicon compound such as a symtetraalkyldivinyldisiloxane, the liquid used to wash the microcapsules is preferably a liquid cyclic or linear polydialkylsiloxane that is a solvent for the catalyst but not the encapsulating polymer(s). More preferably the alkyl radicals on both the reactant and the washing liquid are methyl.

When water is used as the continuous phase of the emulsion from which the encapsulating polymer is precipitated, the continuous phase can contain a surfactant or an emulsifying agent such as polyvinyl alcohol to facilitate formation of the emulsion. The surfactant selected should be one that does not react with or inhibit the catalyst. For example, surfactants containing amino or mercapto groups should not be used, because these groups are known to inhibit platinum-containing hydrosilation catalysts.

Microencapsulated platinum catalyst compositions having average particle sizes of from 5 to about 150 microns or higher can be prepared by mechanical means. In accordance with one such method particles of a finely divided solid such as silica are treated with a liquid or solubilized platinum-containing hydrosilation catalyst. The treated particles are then suspended in a fluidized bed reactor and circulated through a finely divided spray of solubilized or molten encapsulating polymer or the corresponding monomer(s). The particles are exposed to the spray until a coating of the desired thickness is achieved.

If the microencapsulated catalyst contains two layers of different organic polymers, each of the layers is formed independently using any of the foregoing chemical, physicochemical or mechanical methods.

In addition to the microencapsulated catalyst the curable organosiloxane compositions of this invention comprise a polyorganosiloxane, referred to hereinbefore as ingredient (A), containing at least two ethylenically unsaturated hydrocarbon radicals per molecule and a polyorganohydrogensiloxane containing at least two silicon-bonded hydrogen atoms per molecule referred to hereinbefore as ingredient (B). To ensure adequate crosslinking and an acceptable level of physical properties the sum of the average number of ethylenically unsaturated hydrocarbon radicals per molecule of polyorganosiloxane and the average number of silicon-bonded hydrogen atoms per molecule of polyorganohydrogensiloxane is greater than 4.

Ingredient (A) can be a liquid or a high viscosity gum and consists at least in part of diorganovinylsiloxy or organovinylsiloxane units. The silicon- bonded hydrocarbon radicals present in (A) can contain from 1 up to 20 or more carbon atoms. Preferably these radicals are lower alkyl, phenyl or a perfluoroalkylethyl radical such as 3,3,3- trifluoropropyl, this preference being based on the availability of the intermediates used to prepare ingredient (A). Most preferably at least a portion of the repeating units of (A) contain silicon bonded methyl radicals, and the ethylenically unsaturated hydrocarbon present in (A) is vinyl or allyl.

Ingredient (A) contains at least two ethylenically unsaturated radicals that can be present anywhere in the molecule. The ethylenically unsaturated radicals are preferably present at least at the terminal positions of the molecule in the form of a diorganovinylsiloxy groups containing a vinyl radical and two methyl radicals bonded to silicon or a vinyl, a phenyl and a methyl radical bonded to silicon.

If the curable composition is a liquid or paste, the viscosity of (A) is preferably from 1 to 500 Pa.s. Polymers of this type are well known and commercially available. A preferred embodiment of (A) is a polydiorganosiloxane containing at least one monoorganosiloxane unit per molecule, resulting in branching of the polymer molecule. Polymers of this type are described in U.S. Pat. No. 3,284,406 to Nelson, which issued on Nov. 8, 1966.

Alternatively, (A) can be a semi-solid material, known in the art as a gum, exhibiting a viscosity of up to 1000 Pa.s or greater at 25° C. Curable compositions containing this type of polydiorganosiloxane are typically prepared by blending the ingredients under high shear using a two- or three roll rubber mill or in a dough type mixer. Surprisingly it has been found that the microencapsulated catalysts of this invention do not rupture or collapse under the conditions used to process high consistency organosiloxane compositions. The catalysts can therefore be incorporated into this type of curable composition.

Ingredient (A) is cured by a hydrosilation reaction between the ethylenically unsaturated hydrocarbon radicals of this ingredient and the silicon-bonded hydrogen atoms of the curing agent (B). In a typical instance at least one polydiorganosiloxane containing two ethylenically unsaturated hydrocarbon radicals reacts with a relatively low molecular weight, liquid organosiloxane curing agent containing an average of at least three silicon bonded hydrogen atoms per molecule.

Ingredient (B) is an organohydrogensiloxane containing an average of two or more silicon-bonded hydrogen atoms per molecule. It can contain from as few as four silicon atoms per molecule up to an average of 20 or more, and exhibit a viscosity of up to 10 Pa.s or higher at 25° C. Ingredient (B) contains repeating units of the formulae $HSiO_{1.5}$, $R'HSiO$ and/or $R'_2HSi_{0.5}$. The molecules of this ingredient may also include one or more monoorganosiloxane, diorganosiloxane, triorganosiloxy and $SiO_2$ units that do not contain silicon bonded hydrogen atoms. In these formulae R' is a monovalent hydrocarbon radical as defined hereinabove for the R radical of ingredient (A). Alternatively, ingredient (B) can be a cyclic compound containing diorganosiloxane and organohydrogensiloxane units, or a compound of the formula $Si(OSiR'_2H)_4$.

Most preferably R' is methyl and ingredient (B) is a linear trimethylsiloxy terminated polymethylhydrogensiloxane or a dimethylsiloxane/methylhydrogensiloxane copolymer containing an average of from 10 to about 50 repeating units per molecule of which from 3 to 5 are methylhydrogensiloxane.

The molecular weights of ingredients (A) and (B) together with the number and distribution of the silicon-bonded hydrogen atoms and ethylenically unsaturated hydrocarbon radicals within these ingredients will determine the location of crosslinks in the cured elastomer. The concentration of crosslinks per unit volume is often referred to as the "crosslink density" and determines certain physical properties of the cured elastomer, particularly hardness, modulus tensile strength and elongation. The particular combination of polydiorganosiloxane(s) and curing agent(s) yielding the desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured elastomer. Because of the difficulty often experienced in achieving a complete reaction between all of the silicon-bonded hydrogen atoms and all of the vinyl or other ethylenically unsaturated hydrocarbon radicals present in the reaction mixture, it is desirable to have an stoichiometric excess of one of these species in a curable composition. A ratio of from 1.0 to 1.6 silicon bonded hydrogen atoms per vinyl or other ethylenically unsaturated hydrocarbon radical has been found to yield optimum combinations of properties. The preferred ratio for a given composition will be determined at least in part by the average molecular weight of ingredient (A) and the type of curing agent.

The consistency of the present compositions can vary from a flowable liquid to a semi-solid paste to a high consistency gum that will flow only under high shear. In addition to the aforementioned ingredients the compositions can contain other additives including but not limited to reinforcing and non-reinforcing fillers, treating agents for these fillers, pigments, processing aids, stabilizers and flame retardants.

The following examples describe preferred embodiments of the one-part, storage stable curable organosiloxane compositions of this invention, and should not be interpreted as limiting the scope of the invention defined in the accompanying claims. Unless otherwise specified all parts and percentages are by weight and all viscosities were measured at 25° C.

EXAMPLE 1

This example describes the preparation of a microencapsulated catalyst composition of this invention by precipitating a coating of polystyrene around a preferred type of platinum catalyst. The catalyst was obtained by reacting hexachloroplatinic acid and sym-tetramethyldivinyldisiloxane and diluting the reaction product with a liquid dimethylvinylsiloxy terminated polydimethylsiloxane to achieve a platinum content of 0.7 percent. This example also demonstrates the importance of washing the microcapsules with a solvent for the catalyst prior to incorporating the microcapsules in a curable organosiloxane composition.

A reactor equipped with a mechanically operated stirrer and nitrogen inlet was charged with 300 cc. of water and 15 g. of a partially hydrolyzed polyvinyl alcohol available as Vinol 205 from Air Products Co. This mixture was stirred until the polyvinyl alcohol dissolved, at which time a solution containing 2.67 g. of the platinum catalyst, 17.33 grams of polystyrene and 300 cc of methylene chloride was gradually added over a period of one half hour. Following completion of the addition the mixture in the reactor was stirred using a stirrer speed of 400 r.p.m. for one hour, at which time 2000 cc of water was added to reduce foaming. This mixture was stirred for 15½ hours under ambient conditions while passing a stream of nitrogen through the reactor, after which the contents of the reactor were heated at 40° C. for 8¾ hours while maintaining the flow of nitrogen, and were then allowed to remain under ambient conditions for about 16 hours.

This mixture was then centrifuged to concentrate the microcapsules which had formed. The microcapsules were isolated by filtration, washed once with water, twice with methanol, and then allowed to dry for one day. A portion of the microcapsules were retained as sample 1 for incorporation into a curable organosiloxane composition.

The remainder of the microcapsules were combined with cyclic polydimethylsiloxanes, a known solvent for the platinum catalyst, stirred for two hours, and then isolated from the liquid. The resultant capsules. referred to herein as sample 2, contained 70.8 percent of polystyrene and 29.2 percent of the platinum compound, equivalent to 0.184 percent platinum metal.

A one-part curable organosiloxane composition of this invention was prepared by blending the following ingredients to homogeneiety:

14.3 parts of a liquid polyorganosiloxane (A) containing the following repeating units, expressed as mole percentages, where Me represents methyl and Vi represents vinyl:

| Unit | Percent |
|---|---|
| $MeSiO_{1.5}$ | 3.5 |
| $Me_2ViSiO_{0.5}$ | 0.7 |
| $Me_3SiO_{0.5}$ | 2.8 |
| $Me_2SiO$ | 93.0 |

0.71 part of a dimethylhydrogensiloxy terminated polydimethylsiloxane (B); and 0.23 part one of the microencapsulated catalysts, referred to hereinabove, equivalent to 3 ppm of platinum.

The composition containing catalyst sample 1 cured within 3 days at room temperature.

The composition containing catalyst sample 2 that had been washed with cyclic polydimethylsiloxanes did not cure during storage for 300 days under ambient conditions. When the composition was heated at 45° C. it required 12 days to cure. The same composition cured in less than five minutes when heated at 150° C.

EXAMPLE 2

This example describes the preparation and evaluation of a platinum catalyst encapsulated within a shell of polymethyl methacrylate.

A reactor equipped as described in example 1 was charged with 300 cc. of water and 15 grams of the polyvinyl alcohol described in Example 1 and the contents of the reactor were stirred to obtain a homogeneous solution.

A solution prepared by blending 27.64 g. of polymethyl methacrylate, 250 cc of methylene chloride and 2.36 g. of a platinum catalyst was gradually added to the reactor to minimize foaming. The catalyst was a reaction product of hexachloroplatinic acid and sym-tetramethyldivinyldisiloxane and contained 4% platinum. Catalysts of this type are described in U.S. Pat. No. 3,419,593, which issued to Willing on Dec. 31, 1968.

The resultant mixture was stirred for about 16 hours while a stream of nitrogen was passed through the reactor. The microcapsules which formed were isolated and washed as described in Example 1, The capsules were found to contain 86 percent polymethyl methacrylate and 14 percent of the platinum compound, equivalent to 0.056 weight percent platinum.

A one-part curable organosiloxane composition was prepared by blending the following ingredients described in example 1 to homogeniety.

| | |
|---|---|
| 32.0 | parts of (A) |
| 1.6 | parts of (B) |
| 0.052 | part of polymethyl methacrylate microcapsules, equivalent to 3 ppm of platinum |

The composition did not cure during storage for 210 days under ambient conditions but cured in less than 15 minutes when heated at 150° C.

EXAMPLE 3

This example describes the preparation and evaluation of a microencapsulated platinum catalyst of this invention where the encapsulant is a styrene/acrylonitrile copolymer.

To a reactor equipped as described in Example 1 and containing a solution prepared by blending 15 g. of the polyvinyl alcohol described in Example 1 with 300 cc. of water was gradually added a solution prepared by blending to homogeniety 27.64 g of a styrene/acrylonitrile copolymer available as Dow SAN 35% from the Dow Chemical Company, 2.37 g. of the platinum-containing catalyst described in Example 2 and 250 cc. of methylene chloride. The liquid in the reactor was stirred using a stirrer speed of 400 r.p.m. Following completion of the addition the contents of the reactor were stirred under ambient conditions for about 16 hours while the flow of nitrogen through the reactor was continued.

The microcapsules that formed were isolated by filtration, washed with methanol, filtered, and washed with cyclic polydimethylsiloxanes. The microcapsules were in the form of a fluffy powder with no detectable agglomeration. The microcapsules contained 96.2 percent of the acrylonitrite/styrene copolymer and 3.8 percent of the platinum compound, equivalent to 0.144 percent of platinum metal.

The microencapsulated catalyst was used to prepare an organosiloxane composition of the following composition:

33.15 g. of the polyorganosiloxane identified as (A) in Example 1.

1.67 g. of the dimethylhydrogensiloxy terminated polydimethylsiloxane identified as (B) in Example 1, and 0.0561 g. of the microencapsulated catalyst prepared as described in the first part of the preceding Example 3, This composition did not cure during a 210 day exposure to ambient conditions but cured in less than 15 minutes when heated at a temperature of 150° C.

EXAMPLE 4

This example demonstrates the effect of the relative amounts of encapsulant and catalyst composition on the storage stability of curable organosiloxane compositions containing microencapsulated platinum catalysts. The microcapsules were prepared by treating finely divided quartz with a platinum compound and coating the treated particles with an acrylonitrile/styrene copolymer in a fluidized bed reactor.

The platinum compound used was $(Et_2S)_2PtCl_2$. 20 grams of this compound and 10 grams of a dimethylvinylsiloxy terminated polydimethylsiloxane gum exhibiting a Williams plasticity value of about 60 were dissolved in sufficient toluene to form 950 cc. of solution. 1500 grams of finely divided quartz having an average particle size of 30 microns were introduced into this solution and blended to form a slurry. The toluene was then evaporated to yield a slightly yellowish powder.

The treated quartz powder was placed in the chamber of a fluidized bed reactor equipped with a nozzle for spraying the solubilized encapsulant into the chamber. The temperatures of the air entering and exiting from the chamber were 65° C. and 49° C., respectively. The finely divided quartz was held in suspension by the airflow while being exposed to a srpay of a solubilized copolymer containing 75 mole percent styrene units and 25 mole percent acrylonitrile units. The copolymer was applied as a 5 weight percent solution in methylethyl ketone. The coating operation was discontinued when the copolymer constituted 30 or 70 percent by weight of the coated particles.

The capsules containing 30 percent by weight of the copolymer are identified as I and those containing 70 percent by weight of the copolymer are identified as II for the purposes of the following evaluation.

The curable organosiloxane compositions used to evaluate storage stability were prepared by blending the following ingredients to homogeniety:

50 parts of a dimethylvinylsiloxy endblocked polydimethylsiloxane having a viscosity of about 0.4 Pa.s at 25° C., 50 parts of finely divided quartz with an average particle size of 5 microns, and 2.5 parts of a trimethylsiloxy endblocked polydiorganosiloxane having an average of five methylhydrogensiloxane units and three dimethylsiloxane units per molecule and containing from 0.7 to 0.8 weight percent of silicon-bonded hydrogen atoms.

100 parts of this composition was blended to homogeniety with the quantity of microencapsulated catalyst I or II listed in the accompanying table and the resultant curable compositions allowed to stand under ambient conditions. The time required for compositions to cure is listed in the table.

| Catalyst Type | parts | Pt Concentration (ppm) | Storage Stability |
|---|---|---|---|
| I (control) | 0.55 | 10 | 3 days |
| II | 1.28 | 10 | 1 year |

These data indicate that for this particular polymer the coating should constitute more than 30 percent by weight of the encapsulated catalyst composition.

EXAMPLE 5

This example demonstrates the utility of the present microencapsulated platinum catalysts in a one part high consistency curable organosiloxane composition. The composition was prepared by blending the following ingredients to homogeniety on a two-roll mill:

19.93 grams of an organosiloxane polymer composition 0.7 gram of a polystyrene encapsulated platinum catalyst prepared as described in the preceding Example 1 and containing 10 percent by weight of the platinum-containing catalyst These ingredients were blended to homogeniety by eight passes through a two roll mill to form part A1 of a curable composition of this invention.

Part A2 was prepared in a similar manner using 20 grams of the organosiloxane polymer composition and 0.088 grams of a platinum catalyst encapsulated in an acrylonitrile/styrene copolymer. The catalyst was prepared as described in the preceding Example 3.

Part B of the curable composition was prepared by blending the following ingredients to homogeneiety.

100 grams of the same organosiloxane polymer composition used to prepare part A1 and A2, 2.0 grams of a trimethylsiloxy endblocked polydiorganosiloxane having an average of five methylhydrogensiloxane units and three dimethylsiloxane units per molecule and containing from 0.7 to 0.8 weight percent of silicon-bonded hydrogen atoms.

The organosiloxane polymer composition consisted essentially of:

92.5 parts by weight of a dimethylvinylsiloxy terminated polydimethylsiloxane gum containing 0.12 mole percent of dimethylvinylsiloxy units and exhibiting a Williams plasticity of about 60 mils, 7.5 parts of a dimethylvinylsiloxy terminated dimethylsiloxane/methylvinylsiloxane copolymer containing 2 mole percent methylvinylsiloxane units, about 0.8 weight percent of vinyl radicals and exhibiting a Williams plasticity of about 60 mils, 8.0 parts of a hydroxyl endblocked polydimethylsiloxane fluid having a viscosity of about 0.04 Pa.s at 25° C. and contaning about 4 weight percent of silicon-bonded hydroxyl groups, 0.35 part of a hydroxyl terminated diorganosiloxane copolymer wherein the repeating units consist essentially of dimethylsiloxane and methylvinylsiloxane units, and the copolymer contains about 10 weight percent of vinyl radical and about 16 weight percent of hydroxyl groups, and 38 parts of a fume silica having a nominal surface area of 250 $m^2$ per gram.

Two curable composition were prepared by softening part A1 and A2 individually on a two-roll mill and then blending each material with an equal weight of the part B material using a two-roll mill. The containing part A1 was stored for eight months under ambient conditions and the composition containing part A2 was stored for six months. At the end of the storage period neither composition had cured. The compositions could be cured by heating them for several minutes at a temperature of 150° C.

EXAMPLE 6

This example describes the preparation of microcapsules wherein the wall is formed from 2 layers of different thermoplastic organic polymers.

The microcapsules were prepared by precipitating a coating of polystyrene followed by a precipitation of a coating of cellulose acetate butyrate around a preferred type of platinum catalyst. The catalyst was obtained by reacting hexachloroplatinic acid and sym-tetramethyldivinyldisiloxane and diluting the reaction product with a liquid dimethylvinylsiloxy terminated polydimethylsiloxane to achieve a platinum content of 0.7 percent.

A reactor equipped with a mechanically operated stirrer and nitrogen inlet was charged with 300 cc. of water and 15 g. of the polyvinyl alcohol described in Example 1. This mixture was stirred until the polyvinyl alcohol dissolved, at which time a solution containing 5.33 g. of the platinum catalyst, 34.67 grams of polystyrene and 300 cc of methylene chloride was gradually added over a period of several minutes. Following completion of the addition the mixture in the reactor was stirred using a stirrer speed of 400 r.p.m. for two hours. at which time 2700 cc of water was added to reduce foaming. This mixture was stirred for 21 hours under ambient conditions while passing a stream of nitrogen through the reactor, after which the contents of the reactor were heated at 40° C. for 5½ hours while maintaining the flow of nitrogen.

The microcapsules were then isolated and combined with a mixture of cyclic polydimethylsiloxanes, a known solvent for the platinum catalyst, and stirred for two hours. The resultant capsules (I) contained 90 percent of polystyrene and 0.065 percent platinum.

Three grams of the polystyrene-coated microcapsules described in the first part of this example were suspended in a solution containing 3 g. of cellulose acetate butyrate, available as Tenite (R) butyrate from Eastman Chemical Company, dissolved in 150 g of methanol. The resultant dispersion was added to a reactor containing 250 grams of a trimethylsiloxy terminated polydimethylsiloxane exhibiting a viscosity of 500 Pa.s. The resultant mixture was heated at 60° C. for about hours while maintaining a flow of nitrogen through the reactor.

The microcapsules which formed during this period were isolated by filtration, washed with cyclic dimethylsiloxanes and allowed to dry. The microcapsules are referred to hereinafter as II.

A one-part curable organosiloxane composition was prepared by blending the following ingredients to homogeniety:

32.2 g. of the liquid polyorganosiloxane (A) described in the preceding Example 1, 1.62 grams of a dimethylhydrogensiloxy terminated polydimethylsiloxane; and 0.51 gram of the microencapsulated catalyst referred to as II hereinabove, equivalent to 4 ppm of platinum, based on the weight of the curable composition.

A portion of the resultant liquid curable composition was stored under ambient conditions, i.e. a temperature of about 25° C. for 210 days. No significant viscosity increase relative to the initial composition was observed at the end of this time period.

A second portion of the composition was stored for 12 days in an oven maintained at a temperature of 45° C. and did not increase significantly in viscosity during this time period. The oven temperature was then increased to 70° C. The composition cured in one day under these conditions.

A third portion of the composition was heated at a temperature of 150° C. for 10 minutes, and was cured at the end of this period.

That which is claimed is:

1. In an improved one-part, storage stable, heat curable organosiloxane composition comprising (A) a curable polyorganosiloxane containing at least two ethylenically unsaturated hydrocarbon radicals per molecule;

(B) an organohydrogensiloxane containing at least two silicon bonded hydrogen atoms per molecule in an amount sufficient to achieve curing of said polyorganosiloxane (A), where the sum of the average number of ethylenically unsaturated hydrocarbon radicals per molecule of (A) and the average number of silicon bonded hydrogen atoms per molecule of said organohydrogensiloxane (B) is greater than 4, and (C) an amount of a platinum-containing hydrosilation catalyst sufficient to promote curing of said composition at a temperature of at least 70° C. and above, the improvement comprising the presence of said platinum-containing catalyst in the form of microcapsules that in turn, comprise said catalyst as finely divided particles or droplets that are completely enveloped within a thermoplastic organic polymer where the average diameter of said microcapsules is less than 500 microns, and said thermoplastic organic polymer constitutes at least 50 percent of the weight of said microcapsules.

2. An composition according to claim 1 where said thermoplastic organic polymer constitutes at least 70 percent of the microcapsule weight, said polymer is derived from at least one ethylenically unsaturated organic compound or a condensation reaction between at least two organic compounds containing a plurality of condensable groups per molecule.

3. A composition according to claim 2 where said microcapsules are formed by precipitation of a preformed polymer in the presence of said catalyst where said catalyst is in the form of finely divided liquid droplets or finely divided solid particles.

4. A composition according to claim 2 where said polymer is formed in the presence of said catalyst in the form of a finely divided solid.

5. A composition according to claim 2 where said catalyst is the reaction product of a compound comprising a platinum atom and at least one halogen atom with an ethylenically unsaturated liquid organosilicon compound, and said ethylenically unsaturated organic compound is selected from the group consisting of ethylenically unsaturated hydrocarbons, acrylonitrile, esters of acrylic acid and esters methacrylic acid.

6. A composition according to claim 5 where said platinum compound is hexachloroplatinic acid.

7. A composition according to claim 6 where said organosilicon compound is a hexaorganodisiloxane.

8. A composition according to claim 1 where said catalyst is enveloped within an inner and an outer layer of thermoplastic organic polymers.

9. A composition according to claim 8 where said inner and outer layers are formed by precipitation of a preformed organic polymer in the presence of said catalyst in the form of finely divided liquid droplets or finely divided solid particles.

10. A composition according to claim 8 where the polymers constituting said inner and outer layer are different.

11. A composition according to claim 10 where said inner layer is formed from polystyrene and said outer layer is formed from cellulose acetate butyrate.

12. A composition according to claim 1 where said organosiloxane composition is in the form of a liquid.

13. A composition according to claim 1 where said organosiloxane composition is in the form of a high consistency gum.

*14. A composition according to claim 1 where said catalyst is distributed throughout the volume of said microcapsules.*

*15. A composition according to claim 1 where said catalyst is concentrated in one or more core areas of said microcapsules.*

*16. A composition according to claim 15 where said catalyst is concentrated in a single core area of each microcapsule.*

* * * * *